US008644468B2

(12) United States Patent
Dantressangle et al.

(10) Patent No.: US 8,644,468 B2
(45) Date of Patent: Feb. 4, 2014

(54) CARRYING OUT PREDICTIVE ANALYSIS RELATING TO NODES OF A COMMUNICATION NETWORK

(75) Inventors: Patrick Dantressangle, Hampshire (GB); Eberhard Hechler, Sindelfingen (DE); Martin Oberhofer, Bondorf (DE); Michael Wurst, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 13/219,362

(22) Filed: Aug. 26, 2011

(65) Prior Publication Data

US 2012/0155290 A1 Jun. 21, 2012

(30) Foreign Application Priority Data

Dec. 15, 2010 (EP) .................................... 10195219

(51) Int. Cl.
*H04M 15/00* (2006.01)
*H04M 11/00* (2006.01)
*G06Q 30/00* (2012.01)
*G06F 7/00* (2006.01)
*H04L 12/26* (2006.01)
*H04W 4/00* (2009.01)

(52) U.S. Cl.
USPC .................... 379/114.01; 705/7.31; 705/7.36; 705/40; 707/777; 455/405; 370/252; 370/328

(58) Field of Classification Search
USPC .......................... 705/7.31; 707/776, 777, 778
See application file for complete search history.

(56) References Cited

U.S. PATENT DOCUMENTS 5,822,410 A  10/1998  McCausland et al.
7,647,287 B1  1/2010  Slonim et al.
(Continued)

FOREIGN PATENT DOCUMENTS

WO  00/57312      9/2000
WO  2009/077655   6/2009
WO  2010026297   3/2010

OTHER PUBLICATIONS

Dasgupta, K., R. Singh, B. Viswanathan, D. Chakraborty, S. Mukherjea, A. A. Nanavati, and A. Joshi, "Social Ties and Their Relevance to Churn in Mobile Telecom Networks", Proceedings of 11th International Conference on Extending Database Technology, Mar. 2008, 10 pp.

(Continued)

*Primary Examiner* — Ian N Moore
*Assistant Examiner* — Eric P Smith
(74) *Attorney, Agent, or Firm* — Janaki K. Davda; Konrad, Raynes, Davda and Victor LLP (57) ABSTRACT

Predictive analysis relating to nodes of a communication network is carried out by providing communication event information for a first set of nodes and a second set of nodes of the communication network, providing a set of attributes for the nodes of the first set, using the attributes and the communication event information for determining a set of groups among the first set of nodes, assigning each node of the second set to at least one group of the set of groups based at least on the communication event information available for the second group, the assigning resulting in membership information of the nodes of the second set, and deriving or applying a prediction model for the second set of nodes based on the communication event information for the second set and the membership information.

19 Claims, 2 Drawing Sheets

(56) References Cited

U.S. PATENT DOCUMENTS

| | | | |
|---|---|---|---|
| 2006/0293025 A1* | 12/2006 | Chiou et al. | 455/405 |
| 2007/0156673 A1 | 7/2007 | Maga et al. | |
| 2007/0185867 A1 | 8/2007 | Maga et al. | |
| 2008/0167934 A1 | 7/2008 | Rani et al. | |
| 2008/0195360 A1* | 8/2008 | Chiang et al. | 703/2 |
| 2009/0043766 A1* | 2/2009 | Wang et al. | 707/6 |
| 2009/0182625 A1* | 7/2009 | Kilger et al. | 705/10 |
| 2009/0187520 A1 | 7/2009 | Liu et al. | |
| 2009/0190729 A1 | 7/2009 | Chakraborty et al. | |
| 2009/0192809 A1* | 7/2009 | Chakraborty et al. | 705/1 |
| 2009/0292583 A1 | 11/2009 | Eilam et al. | |
| 2010/0076994 A1 | 3/2010 | Soroca et al. | |
| 2010/0100420 A1* | 4/2010 | Anderson et al. | 705/10 |
| 2010/0312612 A1* | 12/2010 | Carr et al. | 705/10 |
| 2010/0324996 A1* | 12/2010 | Kim et al. | 705/14.66 |
| 2011/0213741 A1* | 9/2011 | Shama et al. | 706/13 |
| 2012/0083255 A1* | 4/2012 | Martinez et al. | 455/414.2 |

OTHER PUBLICATIONS

Mozer, M.C., R. Wolniewicz, D. B. Grimes, E. Johnson, and H. Kaushansky, "Predicting Subscriber Dissatisfaction and Improving Retention in the Wireless Telecommunications Industry", IEEE Transactions on Neural Networks, Special Issue on Data Mining and Knowledge Representation, 2000, 14 pp.

Opitz, D. and R. Maclin, "Popular Ensemble Methods: An Empirical Study", Journal of Artificial Intelligence Research, No. 11, 1999, 30 pp.

Thrun, S. and J. O'Sullivan, "Discovering Structure in Multiple Learning Tasks: The TC Algorithm", Proceedings of the Thirteenth International Conference on Machine Learning, 1996, 9 pp.

PCT International Search Report and Written Opinion for International Application No. PCT/EP2011/069328, dated Dec. 7, 2011, 13 pp.

* cited by examiner

CARRYING OUT PREDICTIVE ANALYSIS RELATING TO NODES OF A COMMUNICATION NETWORK

CROSS-REFERENCE TO RELATED FOREIGN APPLICATION

This application is a non-provisional application that claims priority benefits under Title 35, Unites States Code, Section 119(a)-(d) or Section 365(b) of European (EP) Patent Application No. 10195219.0, filed on Dec. 15, 2010, by Patrick Dantressangle, Eberhard Hechler, Martin Oberhofer, and Michael Wurst, which application is incorporated herein by reference in its entirety.

FIELD OF THE INVENTION

The invention relates to a method and a system for carrying out predictive analysis relating to nodes of a communication network, particularly for optimizing communication networks.

DESCRIPTION OF THE RELATED ART

Many telecommunications networks utilize information about individual nodes, such as end-user devices or service offerings and their usage patterns, to optimize the telecommunication system. Typical examples are fraud, error, and service usage prediction or technical service optimization. All tasks depend heavily on the comprehensive and adequate set of technical attributes and related information about individual nodes (e.g. detailed usage patterns, technical attributes and information about the devices, nodes, services, and their corresponding capabilities, etc.).

A problem is that only for some nodes of a telecommunication network, technical information is available on a sufficiently detailed level. These nodes can be characterized as information-rich nodes. However, for other nodes this is not the case at all; only rudimentary partly even smaller inadequate fractions of technical attributes are known for those nodes. These nodes can be characterized as information-poor nodes. This is a severe drawback that limits the ability to apply the same level of technical optimization, analytical insight, and statistical representation about all nodes in a network.

By way of further illustrating this problem space, a Telecommunication (Telco) Service Provider company may be taken as an example. While such a company usually has a lot of information about the devices and technical usage patterns of their customers with a legal contract (where possibly even a device tailored for the Telco provider is used), the same does not hold for the prepaid customers that may use any device and may exhibit any usages patterns. Depending on regulations and practices in various countries, very little technical and non-technical information about such customers and their mobile devices can be collected. In the extreme case, a node is only known by an identification (ID) and it is not linked either to a technical device nor is it clear whether two different IDs actually represent the same node. The only known information components are communication attributes and patterns and the geographical location, as they are needed to establish a connection.

The general approach of using data to optimize processes in telecommunication networks is a traditional task of predictive analytics. Many methods have been developed to approach these tasks. All of these methods assume that adequate information is available about the nodes, on a technical level and about customers on a higher-level.

The article of M. C. Mozer, R. Wolniewicz, D. B. Grimes, E. Johnson, H. Kaushansky, "Predicting Subscriber Dissatisfaction and Improving Retention in the Wireless Telecommunications Industry", published in IEEE Transactions on Neural Networks, Special issue on Data Mining and Knowledge Representation, 2000, for instance focuses on the use of available data from network/call data records (CDRs), billing, application for service, market, and demographic. Where demographics about pre-paid subscribers is available, it can be used in the predictive analysis.

More recently, information about the relationship among the callers has also been taken into account. The article of K. Dasgupta, R. Singh, B. Viswanathan, D. Chakraborty, S. Mukherjea, A. A. Nanavati, A. Joshi, "Social Ties and their Relevance to Churn in Mobile Telecom Networks", published in Proceedings of 11th International Conference on Extending Database Technology (EDBT), Nantes, France, 2008, deals with predictive churn algorithms that concentrate on social network related churn models and prediction. The paradigm stems from the view that the attributes of an individual in a network are less important than their ties (relationships) with other individuals in the network.

US 20080167934 A1 describes a method that acquires information indicative of customer service usage by customers, where the customer retention method then provides an analysis of the acquired information. These services may be related to fixed line device based services (including a Voice over Internet Protocol (VoIP) phone, Personal Computer (PC) desktop client, etc.) or a mobile device, such as a cellular telephone, personal digital assistant (PDA), laptop computer, or the like.

Besides this prior work that is specific to telecommunication, there is also some general work in the field of predictive analytics that could be taken into account here. Usually, it is assumed in predictive analytics that all data records (in the present case representing a node in the network) are described by the same features. An exception is only missing values, that is to say, individual records that may be missing some information, for instance attributes or components, technical specifications, and other measures. There are many different methods to deal with such missing values and most predictive analytics tools (e.g. IBM® INFOSPHERE® WAREHOUSE or IBM® SPSS® MODELER; IBM, INFOSPHERE, and SPSS are trademarks of International Business Machines Corporation in the United States, other countries, or both) implement at least some of them. This is done by most of them by replacing the missing value by a default value or, by a value determined from other features, rules or methods. Latter methods use general correlations among fields (e.g. "AGE" could be used to predict "INCOME"). Such methods do not take the unique characteristics and relation between records into account that is specifically available in telecommunication networks. Also, they work only if the majority of values are not missing. Finally, it is assumed that the same prediction model is created for records with full information and for the ones with missing values. If records with missing values systematically differ from the others, this may introduce a considerable bias.

In the article of S. Thrun and J. O'Sullivan, "Discovering Structure in Multiple Learning Tasks: The TC Algorithm", published in Proceedings of the 13th International Conference on Machine Learning ICML, 1996, a transfer of information between two sets of records that optimize different tasks is described, where all nodes share the same set of known features.

None of the existing prior art adequately takes into account the problem of missing information for a large number of nodes in a telecommunication network in the course of optimizing a predictive analytics task.

Use of predictive analysis is possible for normal subscribers (first set of nodes, information-rich nodes) as communication patterns and profile information (communication event information and attributes) are available for them.

It is problematic to use predictive analysis for pre-paid customers (second set of nodes, information-poor nodes), as only communication event information is available for these nodes.

SUMMARY OF THE INVENTION

It is an objective of the invention to provide a method and system for carrying out predictive analysis relating to nodes of a communication network, particularly when information-poor nodes are included.

The objectives are achieved by the features of the independent claims. The other claims and the description disclose advantageous embodiments of the invention.

A method for carrying out predictive analysis relating to nodes of a communication network is proposed, comprising the steps of:
  providing communication event information for a first set of nodes and a second set of nodes of the communication network,
  providing a set of attributes for the nodes of the first set,
  using said attributes and said communication event information for determining a set of groups among the first set of nodes,
  assigning each node of the second set to at least one group of the set of groups based at least on the communication event information available for the second group, the assigning resulting in membership information of the nodes of the second set,
  deriving or applying a prediction model for the second set of nodes based on the communication event information for the second set and the membership information.

Advantageously, the data of the second set of nodes in a communication network are enriched by matching their properties based in sensor and signals with the one of the first set of nodes. This is of particular advantage when the second set of nodes are information-poor nodes in a telecommunication network and the first set of nodes are information-rich nodes for which this data is known. Then, this information can be transferred to optimize predictive tasks for the information-poor nodes for which these technical attributes and information components were originally not known. This transfer enables to improve prediction modelling for nodes for which only few information components were available initially, which would otherwise result in poor, inadequate prediction modelling capabilities when only using the original data on those nodes. Hence, it is possible to enrich information sets of information-poor nodes by leveraging technical information from information-rich nodes.

The communication event information may comprise communication patterns, for instance. The invention can be advantageously applied to various purposes for doing predictive analytics such as predictions about errors, fraud, customer satisfaction, subscriber churn, location and calling patterns, service usage or technical service optimization.

According to the invention, the selective transfer of information from the information-rich nodes of the first set of nodes to such with less information for optimization and improvement of analytics tasks for information-poor nodes of the second set of nodes may include advanced analytical insight including predictive analytics and deep statistical analysis for the information-poor nodes. The assumption is that this optimization may work rather differently for both kinds of nodes and that information should be transferred in a way that allows optimizing both separately.

A possible application area is optimization in telecommunication networks that consist of or at least comprise post-paid subscribers (i.e. the first set of nodes) and pre-paid subscribers (i.e. the second set of nodes). While for the post-paid subscribers a sufficiently rich set of information about technical usage patterns can be collected, the same does not necessarily hold true for pre-paid customers.

In contrast to prior art, the inventive method advantageously
  takes into account the graphical structure and various patterns as derived by the nodes of the network,
  supports even a potentially high number of nodes with a substantial amount of technical information about nodes missing,
  does allow to selectively transfer an adequate subset of the information from information-rich to information-poor nodes while still treating both separately, allowing different optimization methodologies to be applied that correspond to the content, structure, and attributes of information form both types of nodes,
  does not assume that it is possible to actually re-construct the missing information but rather only optimizes prediction modeling for nodes with fewer information.

The method may further comprise the step of assigning at least one membership weight to each node of the second set of nodes. Preferably, the membership weights of each set second node to each group may be used as additional features for the prediction model.

The method may comprise the step that said assigning step is done based on the communication event information available for the first set of nodes and the second set of nodes.

The assigning step may comprise calculating an aggregated distribution for each group of nodes of the first set of nodes and using a statistical measure to compare communication event information of nodes of the second set of nodes to the aggregated distributions of the groups.

The method may comprise the step that said assigning comprising describing said communication event information with at least one of the following: duration of service usage; distribution over the time; and geographical distribution.

The method may comprise that the first set of nodes relates to information-rich nodes and the second set of nodes relates to information-poor nodes. Particularly, information-rich nodes may relate to normal subscribers and information-poor nodes may relate to prepaid subscribers.

The method may comprise the step that assigning nodes of the second set of nodes to one or more groups among the first set of nodes (subscriber segmentation groups) may be based on general and temporal call patterns, geographic patterns, communication patterns, and/or service usage patterns.

Expediently, the communication event information may comprise communication patterns.

Further, a data processing program for execution in a data processing system is proposed, which comprises software code portions for performing the said predictive analysis method relating to nodes of a communication network when said program is run on a computer.

According to another aspect of the invention a computer program product is proposed, which is stored on a computer usable medium, which comprises computer readable program means for causing a computer to perform said predictive analysis method relating to nodes of a communication network when said program is run on said computer. Particularly the steps comprise provinding communication event information for a first set of nodes and a second set of nodes of the communication network, providing a set of attributes for the nodes of the first set, using said attributes and said communication event information for determining a set of groups among the first set of nodes, assigning each node of the second set to at least one group of the set of groups based at least on the communication event information available for the second group, the assigning resulting in membership information of the nodes of the second set, deriving or applying a prediction model for the second set of nodes based on the communication event information for the second set and the membership information.

A further aspect of the invention is a data processing system for execution of a data processing program comprising software code portions for performing said predictive analysis method.

BRIEF DESCRIPTION OF THE DRAWINGS

The present invention together with the above-mentioned and other objects and advantages may best be understood from the following detailed description of the embodiments, but not restricted to the embodiments, wherein is shown in.

DETAILED DESCRIPTION OF THE EMBODIMENTS

According to the invention, a method for carrying out predictive analysis relating to nodes of a communication network is proposed, comprising the steps of:

providing communication event information (e.g. communication patterns) for a first set of nodes and a second set of nodes of the communication network, providing a set of attributes for the nodes of the first set, using said attributes and said communication event information for determining a set of groups among the first set of nodes, assigning each node of the second set to at least one group of the set of groups based at least on the communication event information available for the second group, the assigning resulting in membership information of the nodes of the second set, deriving or applying a prediction model for the second set of nodes based on the communication event information for the second set and the membership information.

Attributes of a node may refer to characteristics of the device associated with the node, to the characteristics of a subscription associated with the node and/or to the characteristics of a subscriber associated with the node. Examples of device characteristics are type of the device and capabilities of the device. Examples of subscription attributes are, for instance number of services used, type of services, duration, and the like. Examples of the subscriber characteristics are, for instance, age, gender, geographic information, education level, profession, income and the like.

Communication event information refers to information about communications between nodes of the communication network. Communication event information typically indicates nodes communicating with each other and when such communication takes place. An example of Communication event information is a communication pattern describing with which nodes and when a given node communicates. Communication information and/or communication patterns may indicate the duration of the communication and how often communications between nodes occurs.

Assigning refers to assigning an information-poor node to at least one group determined for the information-rich nodes.

Assigning is done based on the communication event information available for the information-poor and information-rich nodes.

The communication event information of information-rich nodes belonging to a given group is processed to obtain a characteristic describing communications in that given group. The communication event information of an information-poor node is compared to the communication characteristic of the groups to find the most appropriate group(s). This assignment may be based on an aggregated distribution that is calculated for each of the groups of information-rich nodes. An example of such an aggregated distribution is, for instance, Gaussian mixtures representing service usage. A statistical measure, such as the Kullback-Leibler divergence, may be used to compare communication event information of an information-poor node to the aggregated distributions of the groups. Other characteristics that can be used to describe communication event information of the groups are, by ways of example, duration of service usage, distribution over time (for instance over the day) or geographical distribution, if available.

To give some examples, the proposed predictive analytics may be used at least for the following purposes: predictions about errors, fraud, customer satisfaction, subscriber churn, service usage, and location and calling patterns.

The prediction model is derived, for example, by training. Training the prediction model consists of finding a statistical model that associates some target variable that represents the purpose of doing predictive analytics (such as e.g. churn) with a set of properties of a node and its membership to different groups. This can be achieved by encoding the membership into one input variable per group and assigning it the group memberships. The training itself can be done with different methods, most notably decision or regression trees and neural networks.

In contrast to prior art methods that are actually trying to identify the true values where they are missing, the approach proposed here selectively transfers adequate pieces of information (that is, assigns the information-poor nodes to one or more groups determined for the information rich-nodes) that are used to optimize prediction modelling for information-poor nodes. The rationale behind this is that often detailed information cannot be discovered correctly, and any attempt to identify missing values could only be executed with an unsatisfactorily low confidence level regarding the accurateness, completeness, and correctness of those values. If it is done all the same, it leads to even working with wrong information (where the rest of the process assumes it to be correct) and can introduce any kinds of errors in analytics process that are very hard to detect at a later stage.

The inventive method, in contrast, first condenses the information in information-rich nodes (i.e. first set of nodes) by using a segmentation algorithm to group these nodes into clusters of "typical" nodes, thus yielding a set of groups among the first set of nodes. This task can be achieved rather easily as enough information is available for these nodes. Then the basic information (e.g. communication patterns) known for information-poor nodes (i.e. second set of nodes) is used to match each of them against one or several of the typical groups. This task is much easier than actually inserting the actual missing information. The membership to typical groups is then used as a feature in the prediction modelling process that can be partly derived or even completely independent from the modelling process used for the information-rich nodes.

In the following, an example embodiment is described in detail where it is assumed that a set of detailed attributes is known for the information-rich nodes that are not known to the information-poor nodes. Communication event information, thus which nodes communicated with which other nodes is available for all nodes, as well as some basic service usage patterns and geographic information.

Advantageously it is possible to obtain detailed information for the information-poor nodes as well. It is important to note here that it is not intended to get the correct values for individual nodes, but rather it is sufficient to get an appropriate level of detailed information as is required for fulfilling the desired predictive analytics tasks. If the prediction model makes an important split between nodes that have a capacity either smaller or larger than 1 GB, then it would not matter for the prediction if a node has capacity 0.5 or 0.6 GB.

This observation is exploited by using a three step process, in which the first and the third steps are generic and can be implemented using arbitrary existing algorithms for the corresponding tasks. The second step represents the core of the proposed innovative method of enriching nodes with information. The last step can then be any predictive analytics task and algorithm.

In the first step, the information-rich nodes (i.e. the first set of nodes) are grouped into groups according to the relevance for the predictive analytics task. This set of groups (typically around ten groups) then contains the essential information about the information-rich nodes. An example for such a group G1 would be G1:=(CAPACITY<30.0 GB AND SPEED>20). Existing and well known analytical models including algorithms may be used to establish an adequate segmentation of the information-rich nodes, resulting in a set of groups among the information-rich nodes.

In the second step, this information is linked to information-poor nodes (i.e. the second set of nodes), assigning each to one or several groups among the information-rich nodes. This assigning is achieved by utilizing the information that is known for both: first communication event information and, if applicable, geographic information. Thus, knowledge and analytical insight about the information-rich nodes is used to enrich the analytical insight about information-poor nodes, where the assigning is established through comparable or similar communication characteristics. This group membership of nodes to groups is then used to enrich the data for information-poor nodes with a single new attribute, namely the aggregated information group that contains condensed information about the information-rich nodes.

In the third step, any predictive analytics algorithm may be applied to the enriched dataset to make predictions about errors, fraud, etc.

In other words, the proposed method consists of the following three major steps:

First step: Finding typical and relevant groups in the information-rich nodes.

Second step: Assigning each information-poor node to one or more of these groups using communication patterns. The assignment to either one or several groups depends on the group definition.

Third step: Deriving or applying a prediction model for information-poor nodes based on their communication data and their membership(s) to aggregated information groups.

Finding typical groups in data is a standard task for predictive analytics and can be tackled with any state-of-the art clustering algorithm. These algorithms are also able to automatically determine a good number of groups to a certain extent.

If there is no information about any special predictive analytics task, just all information in information-rich nodes may be used to do the clustering into groups. If there is sufficient knowledge about an analytical or predictive task available, where the relevant attributes are fully understood, the groups may be easily built according to this information only. In the above example, only capacity and speed would be relevant.

In the following relatively simple example, for instance, three groups G1, G2, and G3 would be identified:
G1:=CAPACITY<1 GB AND DATA=YES
G2:=CAPACITY<1 GB AND DATA=NO
G3:=CAPACITY>=1 GB Having defined aggregated information groups, information-poor nodes must be assigned to these groups based on communication data only. For this purpose, a multi-strategy approach is proposed that uses for instance one or more of the following pieces of information:

general call patterns (distribution of different call types)
temporal call patterns (distribution of call over the day/week)
geographic patterns (from where the calls were made)
communication patterns (which post-paid subscribers were called)
service usage patterns (which Telco services are used, how, and when).

For the first two (i.e. general and temporal call patterns), an aggregated distribution may be calculated in each of the groups. Then a statistical measure can be used to evaluate to which group (G1, G2, or G3) an information-poor node with a given behaviour would most likely belong. For instance, group G1 nodes may probably not make communication during nights. These assumptions are underpinned and validated with the known general and temporal call patterns of information-rich nodes.

For the third piece of evidence (geographic patterns), it can be evaluated which nodes were located in the intermediate surroundings of information-rich nodes and a majority vote can be taken among this information over time.

Any of the above individually derived insight does not have to necessarily be correct, obviously. However, if it is combined into an overall measure of similarity, errors in assigning information-poor nodes to a single or even multiple groups can be substantially reduced. As there will still be cases that are ambiguous, the assignment of a node will be allowed to more than one group. If a node was assigned to more than one group, its record may be added twice with different group membership and a fraction of the overall weight.

An optimal combination of influence factors (that is, which pieces of information are relevant for determining assignment of information-poor nodes to the groups) can be found by, for instance, using a small test set of information-poor nodes for which the full information was assessed manually.

Based on the enriched data set, a prediction model can be built using any state-of-the-art algorithm. Each of the information-poor nodes is extended with the group membership as additional attribute. In the present example, this would mean a group membership of every information-poor node to G1, G2, or G3. As described above, an information-poor node can be split into two, with corresponding weights and different group assignment.

Figure 1:
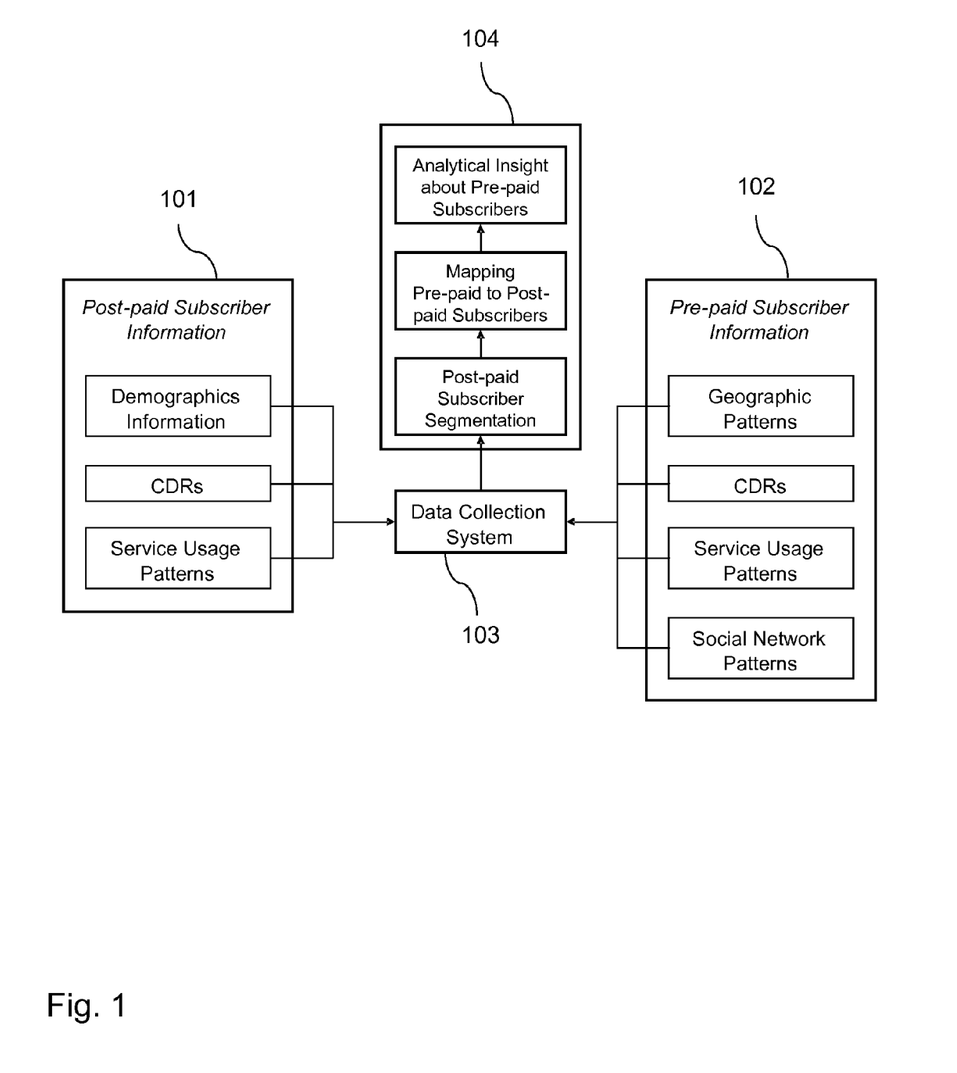
FIG. 1 a depiction of key capabilities and steps of an example embodiment of a predictive analysis systems according to the invention, illustrated for the example of analysing data from pre-paid and post-paid subscribers and for key steps to gain required analytical insight about pre-paid.

The described predictive analysis method is exemplified in an embodiment in FIG. 1, where a high-level depiction of the key capabilities and steps outlined in the above sections is shown. FIG. 1 illustrates the data input components from information-rich pre-paid subscribers ("first set on nodes") and information-poor post-paid subscribers ("second set of nodes") and the key steps to gain the required analytical insight about pre-paid subscribers.

Input from post-paid subscriber information 101 would be:
Demographics information
CDRs
Service usage patterns
Input from pre-paid subscriber information 102 would be:
Geographic patterns (optionally relevant demographics information from publically available sources)
CDRs
Service usage patterns
Social Network patterns Incoming data is gathered, adequately transformed, and stored in data collection system 103. Following are the required processing steps 104 that are using the stored data in the data collection system 103:

Post-paid subscriber segmentation, i.e. using attributes for the post-paid subscribers and communication event information for determining a set of groups among the post-paid subscribers;
Assigning of pre-paid to one or more groups of post-paid subscribers;
Analytical insight about pre-paid subscribers.

Analytic insight may include, for instance, predictions about errors, fraud, customer satisfaction, subscriber churn, location and calling patterns, service usage and/or technical service optimization.

As the proposed method generally applies to all communication event information for the different set of nodes of the communication network, in an advantageous embodiment of the invention communication patterns for said communication event information may be used.

Expediently, predictive analysis may be used for one or more purposes, such as
to analyze CDRs to determine location and calling patterns of pre-paid subscribers of Telco systems;
to analyze service and product usage to determine usage scenario patterns of pre-paid subscribers of Telco systems;
to compare CDR-derived insight and service usage patterns against globally available demographic data;
to compare CDR-derived insight and service usage patterns against existing post-paid subscriber insight and demographic data from any specific Telco Service Provider.

The proposed method may be applied by including leveraging existing subscriber segmentation techniques, such as the so called k-means algorithm, which is a method of cluster analysis which aims to partition a number of n observations into k clusters.

The invention can also be applied in such a way that pre-paid subscribers may be assigned to one or several subscriber segmentation groups based on e.g. general call patterns, temporal call patterns, geographic patterns, communication patterns, and/or service usage patterns.

Advantageously, it is possible to integrate and combine insight from said comparison algorithms and the analytical approach described above. The invention allows inter alia for a refinement of subscriber segmentation based on comprehensive pre-paid subscriber insight, or for service usage prediction of pre-paid subscribers of new service offerings.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of networks adapters.

Figure 2:
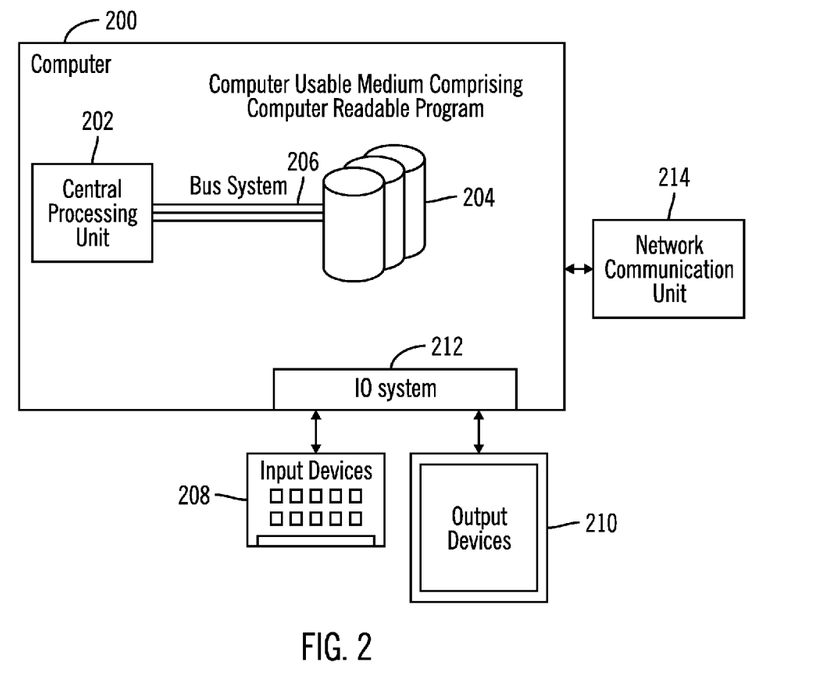
FIG. 2 an example embodiment of a data processing system for performing the method according to the invention.

FIG. 2 schematically depicts an example embodiment of a data processing system, consisting of a computer 200 comprising a central processing unit 202, a computer usable medium, comprising computer readable program 204 connected by a bus system 206 to the central processing unit 202, an IO system 212 connected to input and output devices 208, 210. The computer is further connected to a network communication unit 214. The said data processing system comprises software code portions for performing said predictive analysis method according to at least one of the embodiments of the invention when said program is run on said computer 200.

Prior art often focus on the exact prediction of demographic information to add missing information to a customer relationship management (CRM) system with pre-paid customer records. According to the invention, an improvement of predictive analytics tasks is possible. For this aim, predictions are not needed for exact individual demographics, e.g. AGE=23. Instead, statistically aggregated information is used.

Advantageously, this statistically aggregated information is much more robust against errors and reduces the number of incorrect predictions for the predictive analytics task. Also this robustness reduces the amount of manual tuning considerably.

The inventive method can be used even when predicting exact demographics would fail. From a technical point of view, first specialized statistical segmentation into a set of groups is used and then an assigning is done on these segments or groups, not on the original individual values. This step allows the proposed method to reduce the complexity of the prediction space significantly which in turn reduces the amount of necessary data and makes the models more robust and applicable. Still, it is not required that the same patterns hold for the first and second set of nodes, e.g. and pre-paid subscribers. Thus, independent models for both kinds of subscribers and a robust way to transfer as much information as possible from regular (post-paid) subscribers to pre-paid subscribers.

The invention claimed is:

1. A method for carrying out predictive analysis relating to nodes of a communication network, comprising:
   providing, using a processor of a computer, communication event information for a first set of nodes and a second set of nodes of the communication network;
   providing a set of attributes for the nodes of the first set of nodes, wherein attributes are not available for the nodes of the second set of nodes;
   using the set of attributes and the communication event information to determine a set of groups among the first set of nodes;
   assigning each node of the second set of nodes to at least one group of the set of groups based at least on the communication event information for the second set of nodes, wherein the assigning results in membership information of the nodes of the second set of nodes, and wherein the membership information becomes a first attribute for each node of the second set of nodes;
   assigning at least one membership weight to each node of the second set of nodes, wherein the weight becomes a second attribute for each node of the second set of nodes; and
   deriving a prediction model for the second set of nodes based at least on the communication event information for the second set of nodes, the first attribute of membership information, and the second attribute of weight.

2. The method according to claim 1, wherein a node from the second set of nodes that is assigned to more than one group is added to each group with a fraction of the weight assigned to the node.

3. The method according to claim 1, wherein the assigning of each node of the second set of nodes is done based on the communication event information available for the first set of nodes and the second set of nodes.

4. The method according to claim 1, wherein the assigning of each node of the second set of nodes comprises:
   calculating an aggregated distribution for each group of nodes of the first set of nodes; and
   using a statistical measure to compare the communication event information of the nodes of the second set of nodes to the aggregated distribution of each group.

5. The method according to claim 1, wherein the assigning of each node of the second set of nodes further comprises: describing the communication event information with at least one of a duration of service usage, a distribution over time, and a geographical distribution.

6. The method according to claim 1, wherein the first set of nodes relates to information-rich nodes and the second set of nodes relates to information-poor nodes.

7. The method according to claim 1, wherein the assigning of each node of the second set of nodes further comprises:
   assigning the nodes of the second set of nodes to one or more subscriber segmentation groups based on at least one of general call patterns, temporal call patterns, geographic patterns, communication patterns, and service usage patterns.

8. The method according to claim 1, further comprising:
   using the predictive analysis to perform at least one of comparing network/call-data-records-derived insight and service usage patterns against globally available demographic data and comparing network/call-data-records-derived insight and service usage patterns against existing post-paid subscriber insight and demographic data from any specific Telecommunication Service Provider.

9. The method according to claim 1, wherein the communication event information includes communication patterns.

10. The method according to claim 1, wherein the prediction model is derived by training.

11. The method according to claim 10, wherein the training is performed by finding a statistical model that associates one or more variables representing a purpose of doing predictive analysis with a set of properties of a node of the second set.

12. A computer program product for carrying out predictive analysis relating to nodes of a communication network, the computer program product comprising:
   a computer-readable storage device storing a computer readable program, wherein the computer readable program, when executed on a computer, performs:
   providing communication event information for a first set of nodes and a second set of nodes of the communication network;
   providing a set of attributes for the nodes of the first set of nodes, wherein attributes are not available for the nodes of the second set of nodes;
   using the set of attributes and the communication event information to determine a set of groups among the first set of nodes;
   assigning each node of the second set of nodes to at least one group of the set of groups based at least on the communication event information for the second set of nodes, wherein the assigning results in membership information of the nodes of the second set of nodes, and wherein the membership information becomes a first attribute for each node of the second set of nodes;
   assigning at least one membership weight to each node of the second set of nodes, wherein the weight becomes a second attribute for each node of the second set of nodes; and
   deriving a prediction model for the second set of nodes based at least on the communication event information for the second set of nodes, the first attribute of membership information, and the second attribute of weight.

13. The computer program product according to claim 12, wherein a node from the second set of nodes that is assigned to more than one group is added to each group with a fraction of the weight assigned to the node.

14. The computer program product according to claim 13, wherein the computer readable program, when executed on the computer, performs:

using the at least one membership weight of each node in the second set of nodes as additional features for the prediction model.

15. The computer program product according to claim 12, wherein the assigning of each node of the second set of nodes is done based on the communication event information available for the first set of nodes and the second set of nodes.

16. A data processing system for carrying out predictive analysis relating to nodes of a communication network, comprising:
   a processor; and
   a storage device connected to the processor, wherein the storage device has stored thereon a program, and wherein the processor is configured to execute the program to perform operations, wherein the operations comprise:
   providing communication event information for a first set of nodes and a second set of nodes of the communication network;
   providing a set of attributes for the nodes of the first set of nodes, wherein attributes are not available for the nodes of the second set of nodes;
   using the set of attributes and the communication event information to determine a set of groups among the first set of nodes;
   assigning each node of the second set of nodes to at least one group of the set of groups based at least on the communication event information for the second set of nodes, wherein the assigning results in membership information of the nodes of the second set of nodes and wherein the membership information becomes a first attribute for each node of the second set of nodes;
   assigning at least one membership weight to each node of the second set of nodes, wherein the weight becomes a second attribute for each node of the second set of nodes; and
   deriving a prediction model for the second set of nodes based at least on the communication event information for the second set of nodes, the first attribute of membership information, and the second attribute of weight.

17. The data processing system according to claim 16, wherein a node from the second set of nodes that is assigned to more than one group is added to each group with a fraction of the weight assigned to the node.

18. The data processing system according to claim 17, wherein the computer readable program, when executed on the computer, performs:
   using the at least one membership weight of each node in the second set of nodes as additional features for the prediction model.

19. The data processing system according to claim 16, wherein the assigning of each node of the second set of nodes is done based on the communication event information available for the first set of nodes and the second set of nodes.

* * * * *